United States Patent [19]

Leiby et al.

[11] 4,450,995

[45] May 29, 1984

[54] SCRIBING MACHINE FOR OPTICAL FIBERS AND METHOD

[75] Inventors: John J. Leiby, Mt. Penn; Malcolm H. Hodge, Wyncote; Joseph F. Larkin, Holland, all of Pa.

[73] Assignee: TRW Inc., Redondo Beach, Calif.

[21] Appl. No.: 315,634

[22] Filed: Oct. 28, 1981

[51] Int. Cl.³ .................... C03B 37/16; B26F 3/00
[52] U.S. Cl. .............................. 225/2; 225/96.5; 225/101
[58] Field of Search ............. 225/2, 96.5, 101, 103, 225/105; 65/10.2

[56] References Cited

U.S. PATENT DOCUMENTS

| | | | |
|---|---|---|---|
| 3,934,773 | 1/1976 | Chinnock et al. | 225/2 |
| 4,074,840 | 2/1978 | Fulenwider et al. | 225/96.5 |
| 4,154,385 | 5/1979 | Lewis | 225/96.5 |
| 4,229,876 | 10/1980 | Doty | 225/96.5 X |
| 4,274,572 | 6/1981 | Dunn et al. | 225/96.5 |

FOREIGN PATENT DOCUMENTS 54-128885  10/1979  Japan ............................ 225/96

OTHER PUBLICATIONS

"FIBERS–Simple Testing Methods Give Users a Feel For Cable Parameters", R. B. Chesler et al.; Electronics Aug. 5, 1976 pp. 90–92.
"Fiber–Break Testing by Interferometry: A Comparison of Two Breaking Methods" K. S. Gordon et al.; Applied Optics/ vol. 16, No. 4, pp. 818–819; Apr. 1977.
"A Military Six Fiber Hermaphroditic Connector", J. G. Woods et al.; Proceedings FOC 80 San Francisco pp. 257–261; Sep. 16–18, 1980.

*Primary Examiner*—Frank T. Yost
*Attorney, Agent, or Firm*—Lawrence S. Cohen; Donald R. Nyhagen

[57] ABSTRACT

A scribing machine and method in which the fiber end projecting from a connector or other fiber holder is scribed and severed with a smooth, flat face having a mirror surface at a perpendicular angle to the fiber axis and at the precise length desired for the selected end use. The machine imparts a first preselected level of tension to the fiber during the scribing operation and a second preselected level of tension during the severing operation. The first level is below the tension needed to propagate a crack across the body of the fiber and the second level is above that level. The scribing operation is effected by a tool which is effective to score the surface of the fiber to generate a flaw during the scribing operation, and is withdrawn from engagement with the fiber during the severing operation so that the fiber is suspended without interference as the crack propagates from the flaw across its body.

21 Claims, 7 Drawing Figures

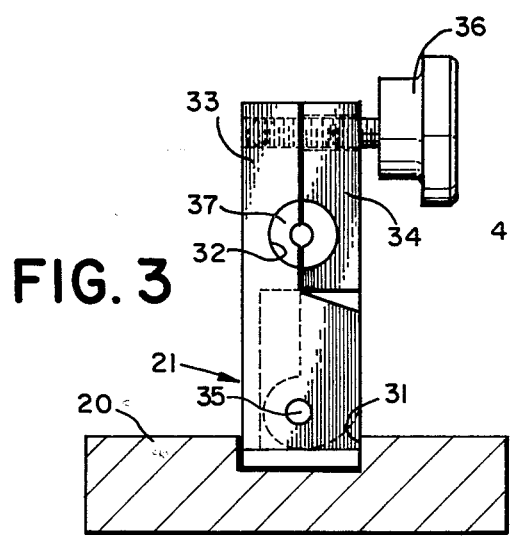
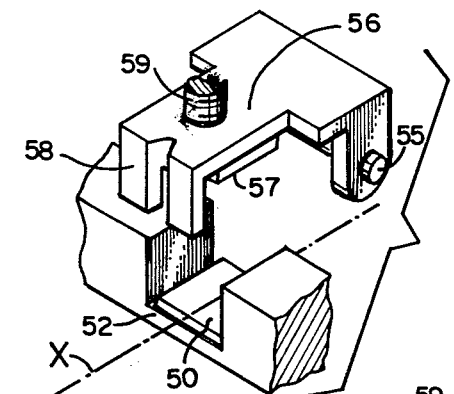
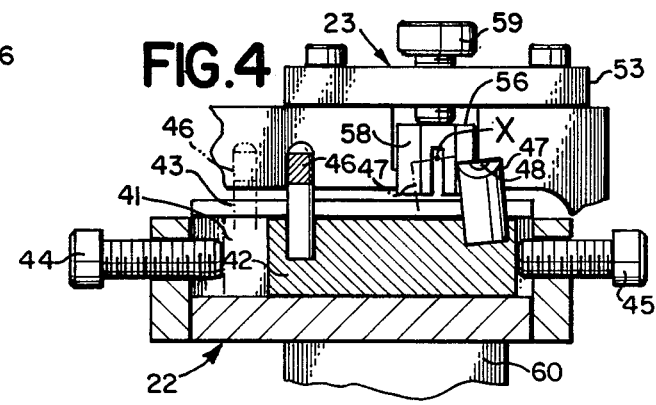
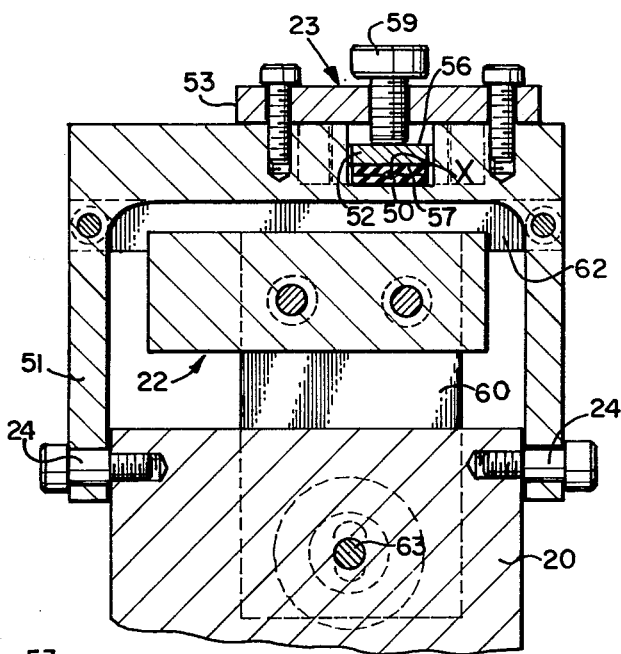
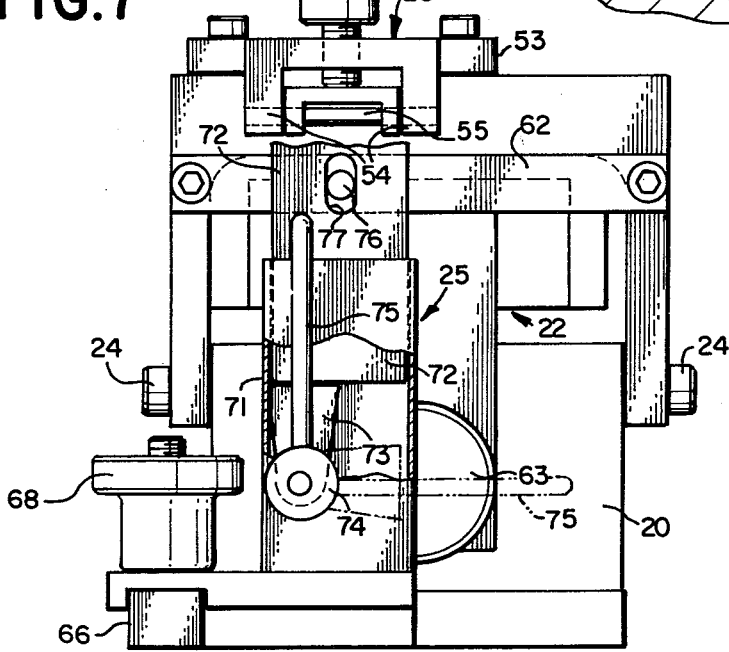

4,450,995

SCRIBING MACHINE FOR OPTICAL FIBERS AND METHOD

GOVERNMENT LICENSE

The U.S. Government has a paid-up license in this invention and the right in limited circumstances to require the patent owner to license others on reasonable terms as provided for by the terms of Contract No. DAAK80-79-C-0772 awarded by the Department of the Army.

FIELD OF THE INVENTION

The present invention relates to apparatus and methods for severing an optical fiber and more particularly apparatus and methods which achieve a precision cleavage of the optical fiber.

BACKGROUND OF THE INVENTION

The invention has utility in the field of fiber optic communications where connections and splicing of single fibers and large groups of fibers is required both in factory assembly of communications equipment and field repair of fiber optic cables and equipment.

It is imperative in making low-loss splices and couples to provide a cut or severed end on the optic fiber having a mirror surface which is smooth, flat and perpendicular to the fiber axis.

DESCRIPTION OF THE PRIOR ART

The present invention is an improvement upon the apparatus and method shown and described in U.S. Pat. No. 4,274,572 of Dunn et al in which the fiber is severed by clamping the cable, connector, or other fiber holder on one side, and clamping the free end of the individual fiber on the other side. As described in the patent, the fiber is tensioned and scribed to generate a flaw in the surface, and the tension is sufficient to propagate a crack from the flaw generated by the scribing operation across the full cross section of the fiber to produce a clean, perpendicular break. The apparatus provides a precisely metered length of the fiber end between the one clamp and the point of scribe and ultimate break so that a precisely measured length of fiber end is achieved.

The apparatus described in this patent repeatedly produces satisfactory breaks with a minimum number of such breaks falling outside the acceptable range.

SUMMARY OF THE INVENTION

The present invention provides an improved apparatus and methods which further reduce the number of unsatisfactory breaks and provide a degree of repeatability which cannot be achieved by any prior procedures, either mechanical or manual.

The apparatus of the present invention is capable of being operated effectively to produce repeatable results consistently by a relatively unskilled operator and yet is inexpensive to produce.

A principle feature of the present invention is the arrangement wherein the fiber holder and the fiber end are clamped and the machine is operated to cleave or break the fiber when the fiber is suspended in a twist-and-torsion-free state to produce a perpendicular break.

More specifically the apparatus of the present invention enables the fiber end to be scribed under conditions which avoid the propagation of the flaw produced by the scribing operation. Thereafter the fiber end is subjected to the precise tension to produce the desired break or cleavage.

In accordance with the method of the invention, the structure of the scribing machine provides means to apply minimum tension to the fiber end during the scribing operation, sufficient to produce a surface flaw, but insufficient to propagate a crack from the flaw, and thereafter applying a proper preselected tension to produce a predictable clean break.

In one embodiment of the apparatus, the fiber spans without any support or interference between the fiber-holder retainer and the fiber-end clamp and the retainer and clamp are biased apart to impart one predetermined minimum tension during scribing, and then subjected to a greater bias to provide a second predetermined breaking tension during cleavage.

BRIEF DESCRIPTION OF THE DRAWINGS

The foregoing summary of the invention as well as the operation and use of the preferred embodiments are set forth more fully hereinafter with reference to the accompanying drawings in which

FIGS. 3 to 6 are fragmentary sectional views taken on the lines 3—3, 4—4, 5—5, and 6—6 respectively of FIG. 2 portions of the apparatus being omitted for clarification of the illustrations;

FIG. 7 is a fragmentary exploded view of the fiber-end clamping components of the clamp assembly;

DESCRIPTION OF THE PREFERRED EMBODIMENTS

Figure 1:
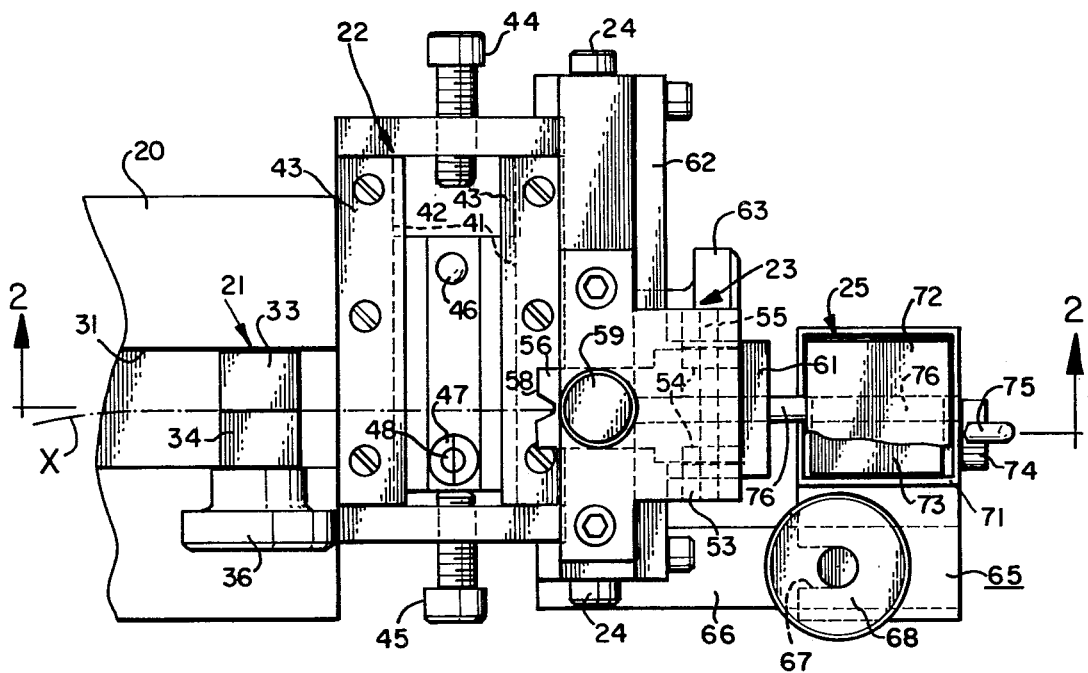
FIG. 1 is a plan view of a first embodiment of a fiber scribing machine made in accordance with the present invention.
Figure 2:
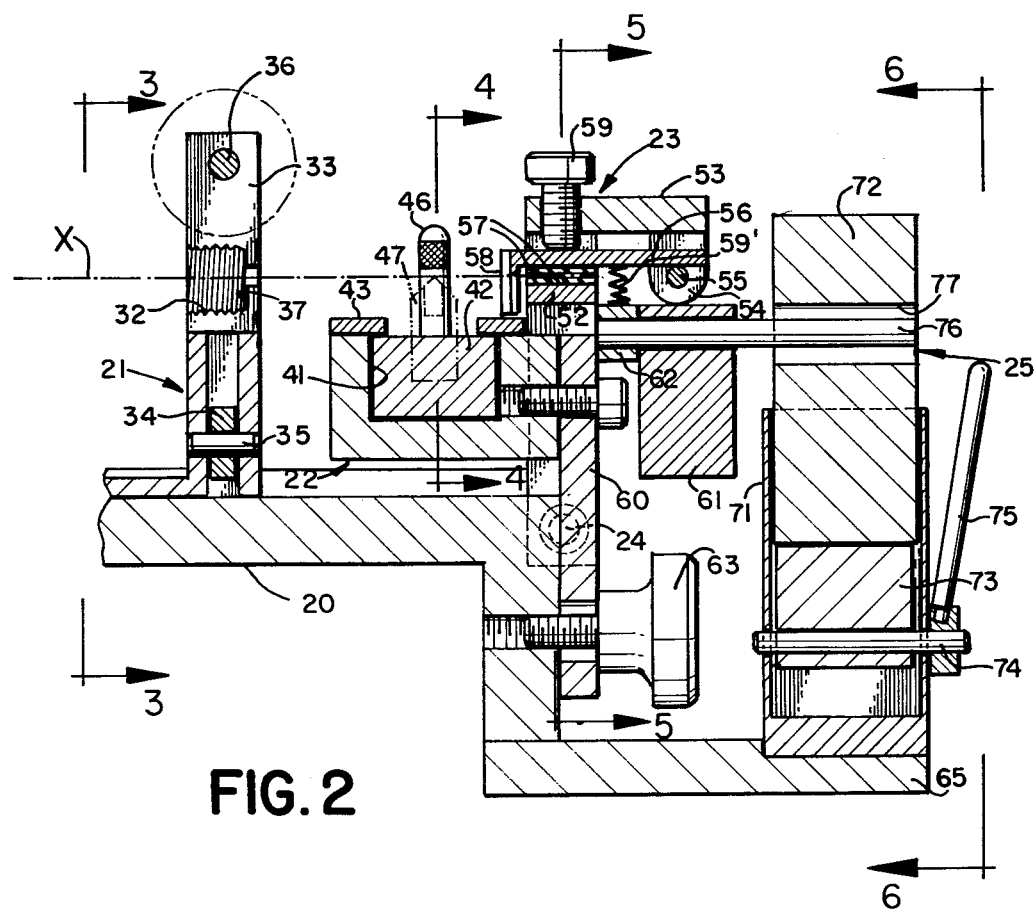
FIG. 2 is a longitudinal section through the machine shown in FIG. 1.

Referring now to the drawing, the scribing machine comprises a base or bed 20 and has a fiber-holder retainer assembly 21 mounted for adjustment longitudinally of the bed 20 at the left hand end, as seen in FIGS. 1 and 2. Centrally of the bed 20, a transversely displaceable scribing assembly 22 is provided, and longitudinally beyond the scribing assembly 22 is a fiber-end clamp assembly 23 pivoted to the bed as indicated at 24 and having a tensioning assembly 25 cooperable therewith to apply predetermined tension to the fiber end which extends from the fiber-holder retainer assembly to the fiber-end clamp assembly.

Referring to FIGS. 1, 2 and 3, the fiber-holder retainer assembly 21 is mounted for longitudinal adjustment in the bed 20 by a guideway 31 which extends longitudinally in the bed 20. Suitable adjustment means (not shown) permit the assembly 21 to be fixed at any selected distance from the scribing assembly 22 so as to permit a precise adjustment of the length of fiber end extending from the fiber holder to the scribing assembly. In the present instance, the fiber-holder retainer assembly is designed to accomodate the fiber clamp from an OPTALIGN ® connector which is manufactured by TRW/Cinch Connectors Division. The fiber holder comprises a longitudinally-split threaded element which is designed to receive and clamp the fiber assembly which encloses the fiber end to be connected. In the connector, the fiber end extends longitudinally through the holder in one connector piece so that it may be abut a similar fiber end positioned in a similar holder in the mating connector piece. The OPTALIGN ® connector is of the type shown in U.S. Pat. No. 4,225,214 granted Sept. 30, 1980 to Hodge et al.

In the present instance, a socket 32 for receiving the fiber holder of the connector is formed in a retainer head comprising an upright post 33 and a cooperating leg 34 pivoted to the post 33 as indicated at 35 and releasably secured thereto by a locking fastener 36. As shown in FIG. 2, the socket opens toward the side of the post 33 which is remote from the scribing assembly 22 and terminates adjacent the scribing assembly 22 in an abutment wall 37 having an opening for the passage of the free fiber end. The fiber holder of the connector is adapted to be threaded into the socket 32 to bottom against the abutment wall 37 to provide a firm reference point for establishing the length of the fiber end extending from the holder. The pivotal mounting of the leg 34 relative to the post 33 permits the socket to be opened for quick insertion of the holder into the socket without the need for threading the holder and the free fiber end into the socket for the full length thereof. In use of the machine, the head is opened for the insertion of the holder. After insertion, the head is closed and locked, and then the holder is threaded to bottom against the abutment wall 37. Thus it is apparent that when adjusting the retainer assembly 21 longitudinally in the guideway 31, the position of the abutment surface 37 when it is adjusted longitudinally of the bed 20, establishes a reference plane for the inserted fiber holder.

As shown in FIGS. 1, 2, and 4, the scribing assembly 22 is mounted for transverse displacement in the bed 20. To this end the assembly is mounted in a transverse guideway 41 and consists of a slide member 42 slidable under the guide rails 43 which overlie the guideway 41 and retain the slide member 42 against upward displacement. The guideway is mounted on a mounting plate 60 for vertical adjustment by means of an adjusting knob 63. Abutments 44 and 45 are provided at the opposite ends of the guideway 41 to limit the displacement of the slide member 42. As best shown in FIG. 4, the slide member 42 has an upstanding operator 46 at the far side of the fiber-end centerline, indicated by the dot-and-dash line X in FIGS. 1 and 2 and by the point X in FIGS. 3 and 4. On the near side of the fiber centerline X, an upstanding scribing knife 47 projects angularly upwardly to the level of the centerline X. The upper surface of the scribing knife is beveled as shown in FIG. 2 and slopes upwardly from left to right as shown in FIG. 4. The central portion of the beveled upper surface is provided with an insert 48, preferably of diamond or other material of comparable hardness.

In operation the normal position of the assembly is the right hand limit position shown in full lines in FIG. 4, and the assembly is operable to be displaced to the left hand limit position as shown in broken lines in FIG. 4 in which the hardened insert 48 intercepts the fiber centerline X and is effective to score the optical fiber and generate a flaw in the outer skin. It is noted that the left hand limit abutment 44 prevents the knife 47 from passing beyond the center line X so that after the scoring operation the assembly may be returned to the right hand limit position so that the fiber end spans between the retainer and the clamp unsupported and without interference.

It is believed that the scoring operation of the apparatus shown in U.S. Pat. No. 4,274,572, the scoring tool when passing under the fiber end frequently caused the fiber end to roll or twist upon its axis and thereby apply torsion to the fiber end during the scoring operation. When a crack was propagated through the fiber in the prior apparatus while the fiber was under torsion, the propagation angle of the crack was not 0°, i.e. perpendicular to the axis of the fiber end. On the other hand, with the scribing knife of the present invention, the hardened portion 48 of the scribing knife does not pass beyond the fiber end and avoids a tendency to impart any substantial twist to the fiber end as it is scribed. Furthermore, as set forth hereinafter, the tension on the fiber end during the scribing operation is maintained below the tension necessary to propagate a crack so that the tension on the fiber end is maintained at a level to provide scoring of the fiber surface without propagation of a crack through the body of the fiber. In operation the slide 42 is returned to the right hand limit position immediately after the scoring operation so as to separate the knife from the fiber end on the center line X and permit the fiber end to span unsupported and without interference between the fiber-holder in the retainer assembly 21 and the clamp assembly 23. When spanning in this fashion, there is no twist in the fiber end.

The apparatus of the present invention provides an improved means for clamping the fiber end to avoid the insertion of twist into the fiber end during the clamping operation, and at the same time provides means for biasing the clamp assembly rightwardly to apply two separate predeterminable degrees of tension to the fiber end after it is clamped in the clamp assembly. As shown in FIGS. 1, 2 and 5, the fiber-end clamp assembly 23 is mounted on a yoke member 51 which straddles the bed 20 and is pivoted thereto as indicated at 24. The yoke 51 includes an anvil portion 52 having on its upper surface a clamping pad 50 which coincides with the centerline X of the fiber end. A bridge portion 53 is spaced above the anvil portion 52 and is provided with a pair of depending journals 54,54 for supporting an axle 55. A clamping jaw 56 is carried by the axle for pivotal displacement thereon. It is noted that the pivotal axis of the axle 55 intercepts the centerline X of the fiber at 90°. As shown in FIGS. 2, 5 and 7, the clamping jaw 56 extends forwardly and overlies the anvil 52 and is provided with a clamping arm pad 57 in registry with the anvil pad 50. The pads 50 and 57 are of a suitable elastomeric material having a durometer which insures proper gripping of the fiber end therebetween, such as rubber.

The present apparatus facilitates insertion of the fiber end between the arm pad 57 and the anvil pad 50. Forwardly beyond the pad 57, the clamping arm is provided with a depending nose portion 58 having a vertical, tapered guiding groove and a open-bottomed notch which cooperate to guide the free fiber end into the space between the anvil pad 50 and the arm pad 57. The clamping arm 56 is biased upwardly by spring means 59' to normally separate the arm pad 57 from the anvil pad 50 to permit ready insertion of the fiber end therebetween. A clamping screw 59 is mounted in the bridge 53 to displace the clamping arm 56 downwardly against its upward bias so as to clamp the fiber end between the pads. Since the pivotal mounting of the clamping arm is on an axis perpendicular to the fiber end and which intersects the centerline X, the fiber is clamped without insertion of twist. It is believed that with the prior art clamp mechanism, a possibility of an angular relationship between the cooperating clamping elements existed and such angular relationship during the clamping operation might cause the fiber to roll and tend to twist the fiber end on its axis. By pivoting the clamping arm transverse to the fiber axis, lateral play in the clamping arm is avoided and any angular orientation of the clamping pad 57 relative to the angle face 52 is along the fiber axis and does not tend to twist the fiber end on its axis. Thus when the clamping screw is adjusted to displace the clamping arm 56 toward the anvil 52, the fiber end disposed between the clamping arm and the anvil is clamped without rolling or applying undesired torsion to the fiber end and when so clamped, the fiber end extending unsupported from the retainer assembly 21 to the clamping assembly is twist-free.

The pivotal mounting of the clamp assembly 23 affords resilient tensioning of the fiber end after it is suitably clamped. To this end, it is noted that the pivotal axis at 24 is forward of the center of gravity of the yoke 51 so that the weight of the yoke 51 and the clamping assembly mounted thereon, is effective to bias the yoke 51 clockwise on the axis of the pivots 24, as seen in FIG. 2. During the clamping operation, the yoke 51 is retained in the upright position shown in FIGS. 1 and 2 by the worker urging a cross piece 62 of the yoke against the mounting plate 60. After the fiber end is suitably clamped, the worker releases the yoke to permit its weight to provide a clockwise bias about the pivot 24. The amount of clockwise bias may be predetermined by a counterweight 61 mounted on the cross piece 62 on the yoke 51 beneath the journals 54,54. It has been found that a proper counterweight 61 exerts approximately 80 grams tension on a 125 micron fiber end spanning from the retainer assembly 21 to the clamp assembly 23. The 80 gram tension on the 125 micron fiber end is sufficient to permit the scribing assembly to generate a flaw in the skin of the fiber without propagating a crack through the body of the fiber. For smaller fibers a lower tension is required, and for larger fibers a greater tension may be employed without propagating a crack through the fiber. In this way any tendency of the scribing assembly to impart twist to the fiber is inconsequential since the scribing assembly is returned to its separated position immediately after the scoring operation is accomplished and before the crack is propagated through the body of the fiber. It should be noted that the tensioning assembly 25 does not affect the tension applied to the fiber end during the scribing operation, as described more fully hereinafter.

After the fiber is scored, a breaking tension is applied to the fiber by the tensioning assembly 25. The tensioning assembly 25 includes a base 65 which is adjustable longitudinally relative to the bed 20 upon an extension 66, the assembly is mounted by a longitudinal slot 67, open at one end and in which an adjusting knob 68 engages to position the base 65 at a preselected distance from the pivot 24. The base has an upstanding tubular guide 71 which slidably receives a generally rectangular weight 72. As shown in FIG. 6, the weight is supported by a cam element 73 which is generally wedge-shaped as shown and is mounted for pivotal movement on an axle 74 by an operator 75 which is rotatable on the pivotal axis of an axle 74 in the bottom of the guide 71.

In the full line position of FIG. 6, the operator 75 positions the cam 73 generally upright so as to support the weight 72 at an elevated position. Displacement of the operator 75 to the broken line position of FIG. 6 pivots the cam 73 to its lower position, thereby removing the support from the weight 72 and permitting it to fall. The weight 72 has an enlarged slot 77 in its upper portion to receive the free end of the tensioning arm 76 which is rigidly mounted on and extends rearwardly from a cross arm 62 on the yoke 51 (See FIG. 2). The vertically elongated slot 77 in the weight 72 permits limited vertical displacement of the arm 76 when the weight 72 is elevated to its inactive position as shown in FIG. 2. The limited movement of the arm may occur when the yoke 51 is released from its upright position to apply scribing tension to the fiber end under the action of the counterweight 61 as discussed above. Thus as described above, the yoke 51 is held in its full upright position as the fiber end is clamped between the pads 50 and 57. After clamping, the yoke is released so as to be free for pivotal movement under the clockwise angular bias of the counterweight 61 to thereby apply scribing tension to the fiber end. The scribing knife 47 is then displaced to intersect the path X of the fiber and is effective to scribe the surface of the fiber and generate a flaw. Thereafter the scribing knife is returned to its inactive position.

After scribing is completed, the tensioning assembly 25 is activated to apply breaking tension to the fiber end. This is accomplished by displacing the operator 75 from the full line position to the broken line position of FIG. 6 thereby releasing the weight 72 so that it may bear upon the tensioning arm 76 and apply a further clockwise bias to the yoke 51. This tension is sufficient to propagate the crack initiated by the scribed surface at a sufficiently high rate to avoid deviation from the planar fracture which provides the desired mirror surface. It has been found that if excessive tension is applied to the fiber end by the tensioning assembly, the cleavage of the fiber progresses too rapidly and causes surface imperfections in the fiber end. A slight excess generates mist or hackling whereas a large excess creating crazing. With this in mind, the tensioning assembly of the present invention applies the desired preselected tension to the fiber end in a substantially instantaneous fashion by releasing the weight 72 to bear upon the tensioning arm 76 in one swift movement. Attempts to increase the tension on the fiber end after completion of the scribing operation with prior art apparatus effected a gradual increase in tension and have led to a greater number of defective breaks than is the case when the apparatus of the present invention is utilized.

The breaking tension applied to the fiber end is preferably approximately 180 grams for fibers of 125 microns. For other fibers, the preferred breaking tension is varied with the square of the ratio of the fiber size relative to a 125 micron fiber. In other words the preferred breaking tension may be calculated by the following formula:

$$\text{Tension} = \text{Approximately } 180 \times \left(\frac{Diam.}{125}\right)^2$$

For fibers with a thermal and/or chemical prestressing history, both the scoring tension and the breaking tension may be reduced because of the internal stresses already present in the fiber.

The scribing machine described above is effective to repeatedly produce the desired break at the predetermined distance from the fiber holder, the break constituting a smooth planar surface perpendicular to the axis of the fiber. Thus when mated with a correspondingly formed end of another fiber within a connector or other splicing arrangement, a low-loss connection is achieved. Such a connection is optimal for transmission of optical signals through the optical fiber.

While a preferred embodiment of the present invention has been illustrated and described herein, it is not intended to limit the invention to such disclosures, but changes and modifications may be made therein and thereto within the scope of the following claims.

We claim:

1. A method for severing an optical fiber projecting from a fiber holder, comprising the step of retaining said fiber holder, clamping the projecting end of the fiber, applying a predetermined first level of tension to said fiber and imparting a flaw to the surface of said tensioned fiber by a scribing device, said predetermined tension being below the level required to propagate a crack through the body of said fiber relieving any torsional stress produce in the fiber by said flaw imparting step, and thereafter, after said scribing device is separated from the fiber, imparting a predetermined second level of tension to said fiber, said second level of tension being above the level needed to propagate a crack through the body of the fiber to provide a mirror surface on the cleaved fiber end and below the level which causes surface imperfections of the cleaved end.

2. A method according to claim 1 wherein said first and second tensions are maintained at a constant level during scribing and during propagation of said crack respectively.

3. A method according to claim 2 wherein said first level is approximately 80 grams.

4. A method according to claim 2 wherein said second level is determined by the formula:

$$\text{Tension} = \text{Approximately } 180 \times \left(\frac{Diam.}{125}\right)^2$$

where the Diameter is expressed in microns and the tension is expressed in grams.

5. A method according to claim 1 wherein said scribing step is effected by engaging the surface of the fiber with a scribing tool operable to impart a flaw.

6. A method according to claim 5 wherein said scribing tool is advanced into the path of the fiber from one side thereof, and is withdrawn from the same side, whereby said tool does not pass beyond the path of said fiber.

7. A methgod according to claim 1 wherein the projecting end of the fiber is clamped while in a twist-free and torsion-free state without twisting or rolling the fiber during such clamping.

8. A method according to claim 7 wherein said second level of tension is applied while the fiber end is in said twist-free and torsion-free state.

9. In a scribing machine for severing optical fibers having a fiber-holder retainer a fiber-end clamp for clamping a fiber with the latter unsupported and free of torsional stress, between said retainer and clamp, and a fiber scribing means between said retainer and clamp, the improvement comprising a first bias means to hold the fiber end in a path between said retainer and clamp at a preselected tension high enough to render said scribing means effective to generate a flaw in the fiber surface and low enough to preclude propagation of a crack through the body of the fiber, and a second bias means to apply a second level of tension to the fiber end held between said retainer and clamp after disengagement of said scribing means from the fiber and release of any torsional stress produced in the fiber by said scribing means, said second level of tension being high enough to propagate a crack through the body of the fiber and produce a planar end surface without crazing.

10. A scribing machine according to claim 9 wherein said scribing means comprises a knife displacable between two positions, in one of said positions said knife being spaced from said path of the fiber end and in the other of said positions said knife intersecting said path.

11. A scribing machine according to claim 10 including a limit stop for said knife to prevent passage of said knife beyond the said path of the fibers.

12. A scribing machine according to claim 9 wherein said fiber-end clamp comprises an anvil and a pivoted clamp arm cooperable with said anvil, the pivotal axis of said clamp arm being transverse to the axis of said fiber end.

13. A scribing machine according to claim 12 wherein said pivotal axis intersects said fiber axis.

14. A scribing machine according to claim 12 including elastomeric clamping pads on said anvil and said clamp arm.

15. A scribing machine according to claim 12 wherein said anvil and said clamping arm are mounted on a yoke member pivoted on a tension axis transverse to said fiber axis at a point remote from the path of the fiber end so that an angular bias about said tensioning axis applies axial tension to the fiber end clamped between said anvil and clamp.

16. A scribing machine according to claim 15 including a counterweight positioned on said yoke member to comprise said first bias means applying said first preselected tension of the fiber end.

17. A scribing machine according to claim 15 including a separate weight member carried by said yoke member, and selectively operable means to render said separate weight member either operable to apply said second preselected tension to the fiber end, or inoperable so as not to affect the tension on said fiber.

18. A scribing machine according to claim 17 wherein yoke member has a projecting weight arm, and said weight member has a vertically-elongated slotted opening to receive said weight arm, said selectively operable means when operable supporting said weight on said arm and when inoperable supporting said weight independently of said arm to permit vertical displacement of said arm in said slotted opening.

19. A scribing machine according to claim 9 wherein said fiber-holder retainer includes an abutment wall to provide a reference plane perpendicular to the axis of the fiber end for the space from the fiber-holder to the scribing means.

20. A scribing machine according to claim 19 wherein said retainer includes a socket for retaining said fiber holder against said abutment wall.

21. A scribing machine according to claim 20 wherein said socket is in a split head to afford lateral insertion of the fiber holder into said socket, and including locking means to close said split head.

* * * * *